(12) United States Patent
Momochi et al.

(10) Patent No.: US 7,229,396 B2
(45) Date of Patent: Jun. 12, 2007

(54) TOOL REPLACEMENT METHOD AND NUT DRIVER FOR MACHINE TOOLS

(75) Inventors: Takeshi Momochi, Numazu (JP); Masahiko Takasugi, Shizuoka (JP); Hidemi Yoshino, Numazu (JP); Takao Arai, Uji (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/546,290

(22) Filed: Oct. 12, 2006

(65) Prior Publication Data

US 2007/0092349 A1 Apr. 26, 2007

Related U.S. Application Data

(62) Division of application No. 10/611,341, filed on Jul. 2, 2003, now Pat. No. 7,144,355.

(30) Foreign Application Priority Data

Jul. 3, 2002 (JP) ............................ P2002-194979

(51) Int. Cl.
*B23Q 3/157* (2006.01)

(52) U.S. Cl. ................................. 483/31; 483/1; 483/7

(58) Field of Classification Search .................... 483/7, 483/4, 5, 8, 32, 31, 19, 20, 33, 60; 279/902, 279/900, 91; 29/33 R, 33 K, 705; 81/52, 81/54

See application file for complete search history.

(56) References Cited

U.S. PATENT DOCUMENTS

| 5,382,213 A | 1/1995 | Kopel et al. |
| 6,030,326 A | 2/2000 | Azuma et al. |
| 6,149,562 A | 11/2000 | Patel et al. |

FOREIGN PATENT DOCUMENTS

| DE | 4007072 A | 9/1991 |
| DE | 69300950 T | 5/1996 |
| DE | 19957217 A | 5/2001 |

OTHER PUBLICATIONS

German Office Action dated May 10, 2005 (3 pages).

*Primary Examiner*—Dana Ross
(74) *Attorney, Agent, or Firm*—Finnegan, Henderson, Farabow, Garrett & Dunner, L.L.P.

(57) ABSTRACT

A spindle (5) has a chuck (9) provided on a distal end (5a) thereof for chucking a tool (11), and a nut (13) screwed to the distal end (5a) and rotatable for tightening and loosening the chucking. The spindle (5) is positioned relative to a nut loosening station provided with a nut loosening driver (43) for driving the nut (13) to rotate in a loosening direction, the nut (13) is loosened by the nut loosening driver (43) to remove from the chuck (9) a first tool (11) to be replaced with a second tool (11), the spindle (5) is positioned relative to a nut tightening station provided with a nut tightening driver (41) for driving the nut (13) to rotate in a tightening direction, and the nut (13) is driven by the nut tightening driver (41) to tight-chuck the second tool (11).

5 Claims, 6 Drawing Sheets

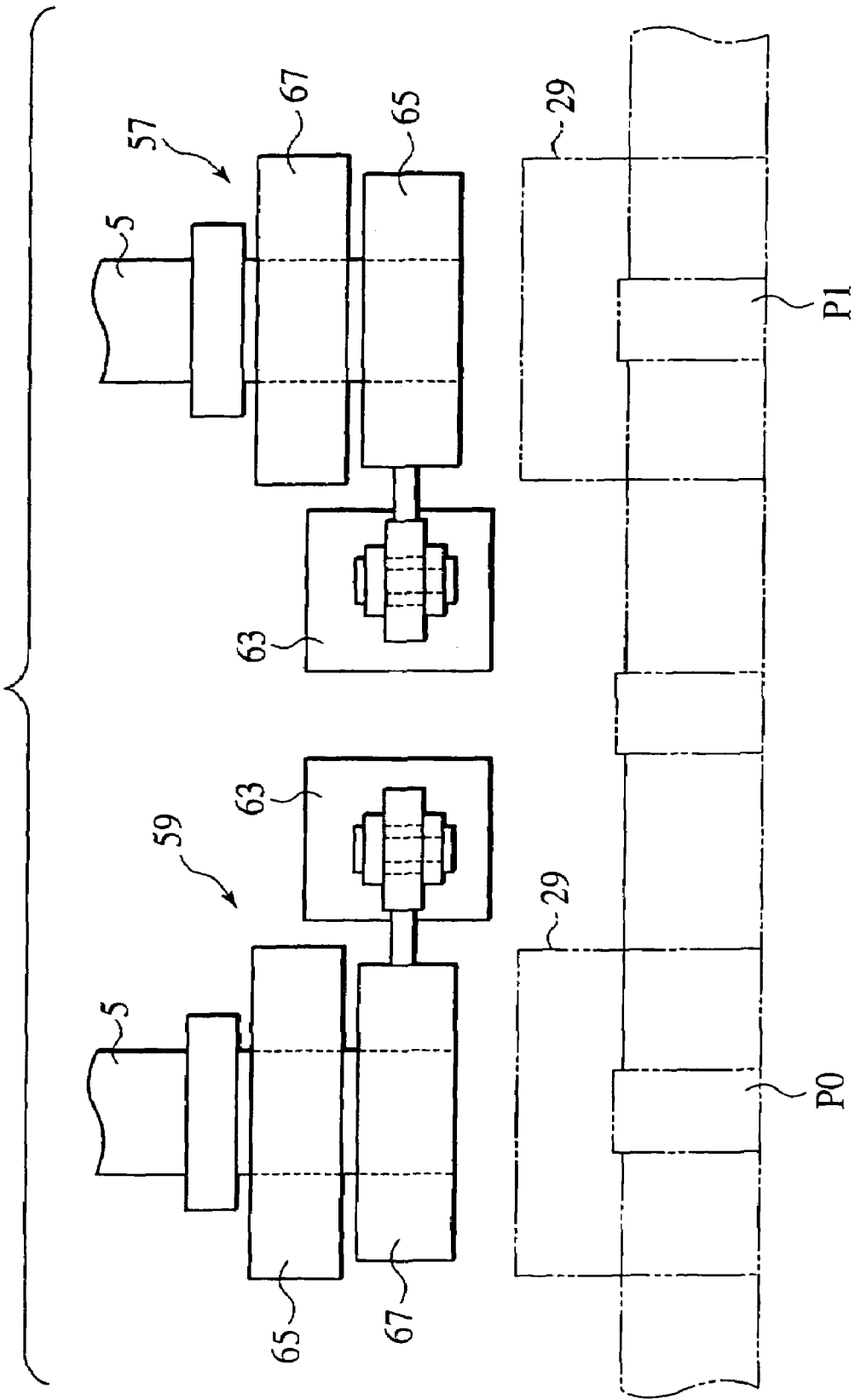

TOOL REPLACEMENT METHOD AND NUT DRIVER FOR MACHINE TOOLS

This application is a divisional of application Ser. No. 10/611,341, filed Jul. 2, 2003 now U.S. Pat. No. 7,144,355, which claims the benefit of priority from the prior Japanese Patent Application No. 2002-194979, filed Jul. 3, 2002, the entire contents of both of which are incorporated herein by reference.

BACKGROUND OF THE INVENTION

1. Field of the Invention

The present invention relates to a tool replacement method for machine tools and a nut driver therefor, and in particular to tool replacement method and a nut driver for a machine tool including a spindle having a chuck provided on a distal end thereof for chucking a tool and a nut screwed to the distal end and rotatable for tightening and loosening the chucking.

2. Description of Relevant Art

In a conventional machine tool, the spindle has a chuck adaptive for chucking thereto one of a variety of rotary tools to be replaceable with another. For example, the collet chuck falls in a variety of types, such as a draw-bar type configured to draw in or push out a chuck by a draw bar axially movable in the spindle, or a screw-mount type configured with a nut screwed on a distal end of the spindle and configured to be tightened or loosened to thereby tighten or loosen a chuck.

The draw-bar type is configured for reciprocating the draw bar, e.g. by a cylinder, to tighten or loosen the chuck, and easily adaptive for automatic replacement of tool.

However, the screw-mount type employs a rotating tool such as a wrench for manual replacement of tool.

SUMMARY OF THE INVENTION

The present invention has been made in view of such points. It therefore is an object of the present invention to provide a nut replacement method for machine tool and a nut driver for machine tool, allowing an automatic tool replacement of screw mount type.

To achieve the object, a first aspect of the invention provides a tool replacement method of performing a replacement of a tool to a spindle of a machine tool in which the spindle has a chuck provided on a distal end thereof for chucking the tool and a nut screwed to the distal end and rotatable for tightening and loosening the chucking, the method comprising the steps of: positioning the spindle relative to a nut loosening station provided with a nut loosening driver for driving the nut to rotate in a loosening direction of the nut; driving the nut by the nut loosening driver to remove from the chuck a first tool to be replaced with a second tool; positioning the spindle relative to a nut tightening station provided with a nut tightening driver for driving the nut to rotate in a tightening direction of the nut; and driving the nut by the nut tightening driver to tight-chuck the second tool.

Further, to achieve the object, a second aspect of the invention provides a nut driver for a machine tool including a spindle having a chuck provided on a distal end thereof for chucking a tool and a nut screwed to the distal end and rotatable for tightening and loosening the chucking, the nut driver comprising: a nut tightening driver engageable with the nut for driving the nut in a tightening direction of the nut; a nut loosening driver engageable with the nut for driving the nut in a loosening direction of the nut; and a station holder configured to be positioned relative to the spindle, and to mount thereon a neighboring combination of the nut tightening driver and the nut loosening driver.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 7 is an elevation of an essential portion of a machine tool in which tools are replaced in accordance with the invention.

DETAILED DESCRIPTION OF THE PREFERRED EMBODIMENTS

Figure 1:
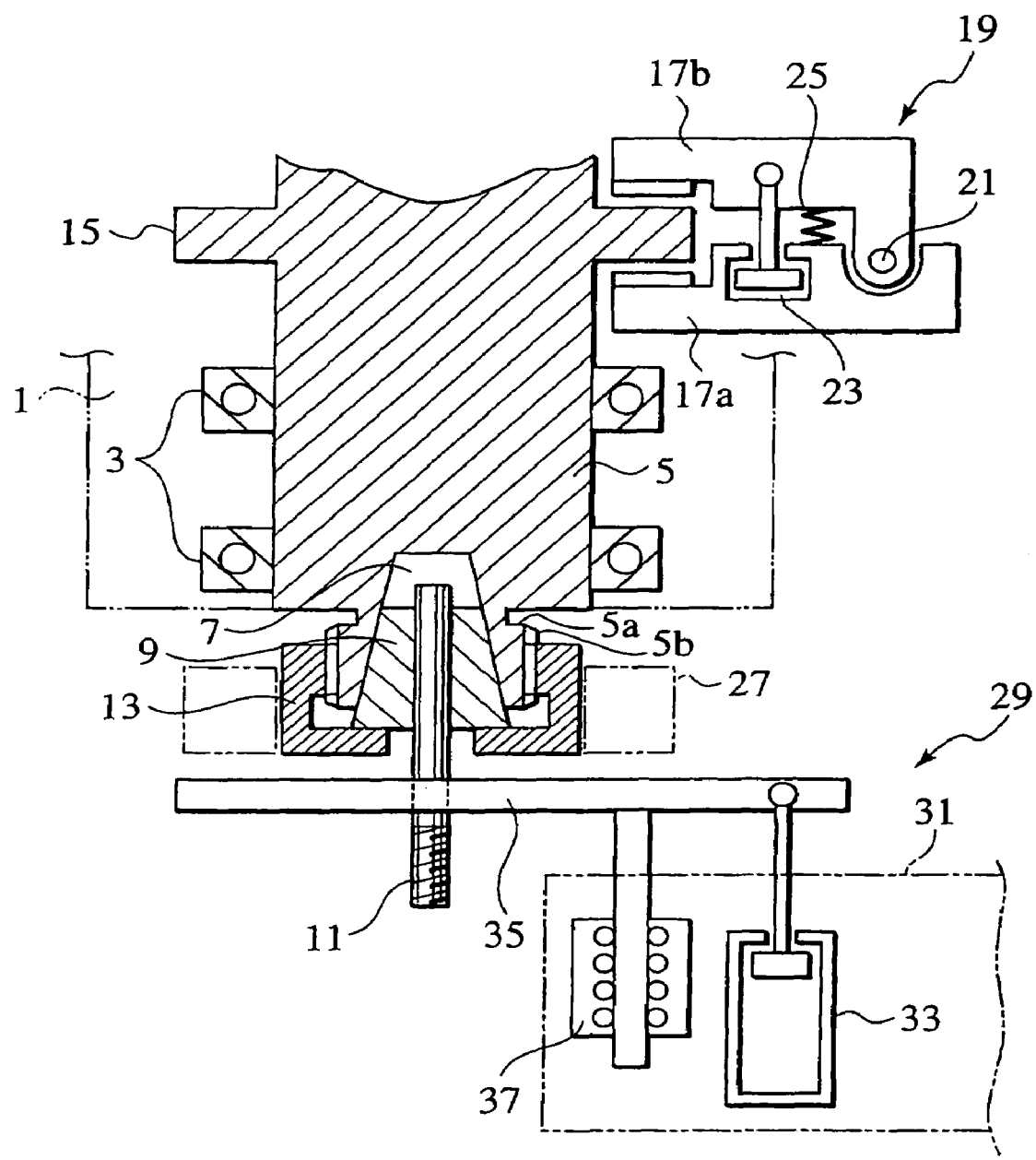
FIG. 1 is an elevation of an essential portion of a machine tool including a tool to be replaced, and a nut driver according to a first embodiment of the invention.

There will be detailed below the preferred embodiments of the present invention with reference to the accompanying drawings. Like members are designated by like reference characters.

FIG. 1 shows an essential portion of a machine tool including a spindle supporting part 1, such as a spindle holder, on which a spindle 5 is rotatably borne via bearings 3. The spindle 5 has a taper hole 7, in which an axially split cone-frustum-shape chuck member 9, such as a collet chuck, is fit for use to chuck a tool 11, such as an elongate cutting tool. To adjust the chucking to be tight or loose; the chuck member 9 is cooperative with a cap nut 13 (by slidable touching engagement of a bottom face of the former 9, with an annular upside region of a flat bottom part of the latter 13, which is formed with a through hole for removal and application of the tool 11), as the nut 13 is rotatably screwed at its upper part to a male thread 5b formed on a periphery of a distal end protrusion 5b of the spindle 5, where the taper hole 7 is formed. The machine tool may have two or more spindles.

When the nut 13 is rotated in a forward direction (clockwise in top or bottom view, as circumstances require, hereafter simply referred to "CW") to tighten the chucking, the chuck member 9 is inserted into the taper hole 7, so that the tool 11 is tight-clamped. On the contrary, when the nut 13 is rotated in a reverse direction (counterclockwise in top or bottom view, as circumstances require, hereafter simply referred to "CCW") to loosen the chucking, the clamping of tool 11 by the chuck member 9 gets loose, so that the tool 11 can be removed from the chuck member 9.

The chucking of tool 11 by the chuck member 9 can thus be tightened or loosened by forward or reverse rotation of the nut 13. In other words, by rotation of the nut 13, the chuck member 9 is operative for tight or loose chucking to thereby allow the tool 11 to be attached or detached, so that the tool 11 can be replaced.

During forward or reverse rotation of the nut 13, the spindle 5 is fixed in position by a spindle fixing mechanism.

In the embodiment, this mechanism is configured as the combination of a rotary flange 15 integrally rotatable together with the spindle 5, and a brake 19 (or spindle stopper) mounted on an available stationary part of the machine tool. The brake 19 is made by lower and upper clamp jaws 17a and 17b configured to clamp the rotary flange 15 therebetween. The clamp jaws 17a and 17b are mutually pivoted by a hinge pin 21, and normally biased to open by a spring 25, but they can be closed, when necessary, by an actuator 23 such as a cylinder. The clamp jaws 17 and 17b may be normally closed by the spring 25, and opened, when necessary, by the actuator 23.

By operation of the actuator 23, the brake 19 can firmly clamp the rotary flange 15 between the clamp jaws 17a and 17b, so that the spindle 5 is kept from rotation. When the nut 13 is rotated in the forward or reverse direction, the brake 19 is operated to hold the spindle 5 in a fixed state, where its rotation is prevented.

The nut 13 is driven to rotate by a nut handling mechanism or robot (herein called "nut driver") 27 shown by phantom lines in FIG. 1, which is adapted for automatic forward and reverse rotation of the nut 13, and can cooperate with a tool handling mechanism or robot (herein called "tool changer") 29, such as an ATC (automatic tool changer), to effect automatic replacement of tool 11 by detachment (of 1'1 from 5) and attachment (of 11 to 5) with respect to the spindle 5.

The tool changer 29 includes a carrier 31 that can travel between a reference position in a service region for replacement of tool 11 to the spindle 5 and preset positions within a tool handling region of a tool supply station (not shown) that is adapted for accommodation or storage of various tools (including tool 11) that can be individually attached to and detached from any of spindle(s) of the machine tool (including spindle 5) by cooperation with the nut driver 27. The carrier 31 has a reciprocal actuator 33 such as a fluid pressure cylinder, a tool holding jig 35 which is configured to hold the tool 11 in upright position and to be reciprocally moved (e.g. upward and downward in FIG. 1) by the reciprocal actuator 33, and a linear guide 37 for guiding the tool holding jig 35.

The tool changer 29 is adapted for necessary functions for tool replacement, including: operating the tool holding jig 35 to remove the tool 11 from the spindle 5, where it has been mounted, and accommodate the same in a corresponding one of tool pots provided in the tool supply station; and further operating the jig 35 to take out a tool 11 from a particular tool pot, where it has been set, and apply the same to the spindle 5. It can travel to the position of any tool pot.

The tool holding jig 35 may be formed with a tool receiving through hole or a recessed tool engagement part engageable with the tool 11, like an arm in a typical ATC, or may have a desirable configuration such as with a clamp to hold and release a tool.

The tool changer 29 is operated in accordance with rotation of the nut 13 by the nut driver 27, so as to allow the tool 11 to be automatically replaced by detachment from and attachment to the spindle 5.

For example, in FIG. 1, first, a tool receiving hole of the tool holding jig 35 is set beneath the tool 11, and moved upward by operation of the actuator 33 so that a lower part of the tool 11 is engaged with the hole of the jig 35. The rotary flange 15 of the spindle 5 is fixed by the brake 19. Then, the nut 13 is rotated CCW by the nut driver 27, so that the chuck member 9 comes down by a slight commensurate distance along the taper hole 7, and the chucking of the tool 11 by the chuck member 9 is loosened. The tool 11 has its own weight and may drop into and received by the hole of the jig 35. The tool 11 may then be clamped and pulled down, if the jig 35 is adapted therefor. The jig 35 is moved downward by operating the actuator 33.

If the jig 35 is adapted for handling a single tool, the detached or removed tool 11 is carried away together with the jig 35, as the carrier 31 travels to the tool supply station, where the removed tool 11 is returned from the jig 35 to a tool pot. Then, the jig 35 receives a new tool 11, which is carried beneath the chuck member 9, as the carrier 31 travels to the service region for replacement. If the jig 35 is adapted for handling two or more tools, it is simply slid to set the removed tool 11 aside, and concurrently set a new tool 11 beneath the chuck member 9.

As the jig 35 is again moved up, an upper part of the new tool 11 is inserted, through the hole in the bottom part of the nut 13, into a central space of the chuck member 9. Then, the nut 13 is rotated CW by the nut driver 27, so that the chuck member 9 wedges into the taper hole 7 by a commensurate distance, and the chucking of the new tool 11 by the chuck member 9 is tightened, i.e., the new tool 11 is attached to the spindle 5. The jig 35 is again moved downward, so that the new tool 11 is disengaged from the jig 35. Finally, the brake 29 is operated to release the rotary flange 15.

Figure 2:
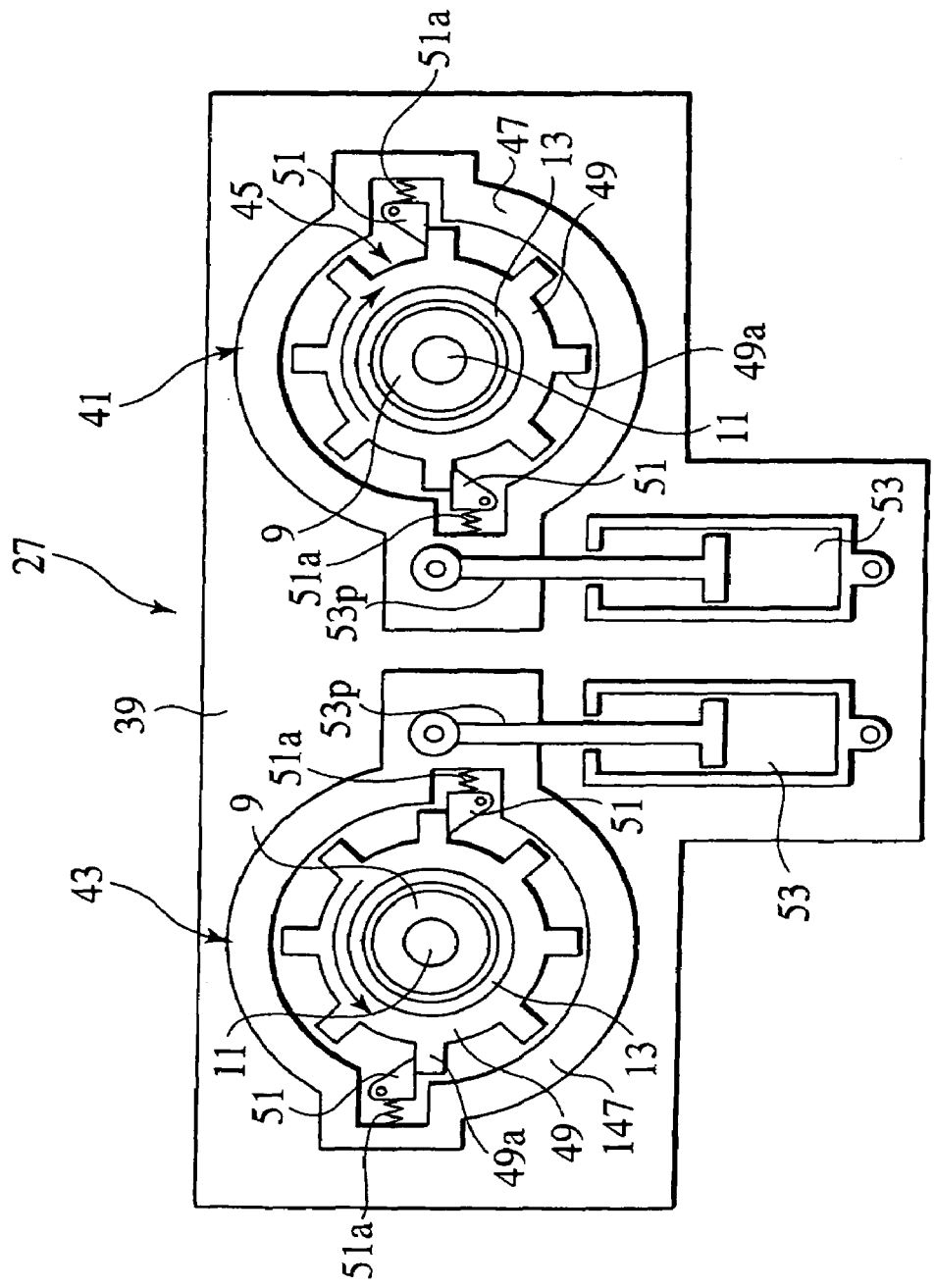
FIG. 2 is a plan of the nut driver of FIG. 1.

FIG. 2 shows a plan of the nut driver 27, which is configured to drive the nut 13 to rotate in a forward direction (CW) and in a reverse direction (CCW).

The nut driver 27 is configured as a combination of a nut tightening station and a nut loosening station neighboring each other. In other words, the nut driver 27 is configured with: a forward driver 41 as a nut tightening driver to be engaged with the nut 13, as it is to be rotated in a tightening or forward direction (CW); and a reverse driver 43 as a nut loosening driver to be engaged with the nut 13, as it is to be rotated in a loosening or reverse direction (CCW). The nut driver 27 has a station holder 39 as a base for mounting thereon the forward driver 41 and the reverse driver 43. The station holder 39 may be mounted on the tool handling jig 35, or solely arranged so that it can be positioned relative to individual tool pots of the tool supply station, in which some tool pots have tools set therein in advance and selective thereamong to be applied to the spindle 5, while the remaining tool pots are left empty and available for accommodation of the tool 11 removed from the spindle 5.

The forward driver 41 has a one-directional rotary mechanism holder 47 provided with a one-directional rotary mechanism 45 engageable with the nut 13, to drive the nut 13 to rotate simply in the forward direction (CW).

More specifically, in this embodiment, the one-directional rotary mechanism 45 is configured with a ratchet mechanism allowing nut rotation simply in one direction, in which a ring-gear-like ratchet wheel 49, which is engaged at its inner periphery with the nut 13 and formed at its outer periphery with many ratchet pawls 49a at proper angular intervals, is pivoted on the station holder 39 so as to be CW rotatable. On the other hand, the one-directional rotary mechanism holder 47 formed ring-like to enclose the ratchet wheel 49 is reciprocally rotatably pivoted on the station holder 39, and has ratchet pawls 51 thereof arranged therein and normally one-directionally biased by associated springs 51a. These pawls 51 engage leading sides of pawls 49a of the ratchet wheel 49, causing the ratchet wheel 49 to rotate CW, when the one-directional rotary mechanism holder 47 rotates CW, but ride over trailing sides of pawls 49a of the ratchet wheel 49, when the one-directional rotary mechanism holder 47 rotates CCW. Accordingly, simply CW rotation of the one-directional rotary mechanism holder 47 is transmitted to the ratchet wheel 49.

To effect reciprocal rotation of the one-directional rotary mechanism holder 47, the station holder 39 is provided with a reciprocal actuator 53, such as a fluid pressure cylinder, which has a reciprocally acting rod 53p, such as a piston rod, pivotally connected at its distal end to an available position on the one-directional rotary mechanism holder 47. The station holder 39 has, at a location thereon corresponding to the ratchet wheel 49, a through hole (not shown) formed therein to allow insertion of the nut 13.

As the one-directional rotary mechanism holder 47 is reciprocally rotated by operating the actuator 53, when the ratchet wheel 49 is engaged with the nut 13, simply forward rotation of the one-directional rotary mechanism holder 47 is intermittently transmitted to the ratchet wheel 49, causing the nut 13 to rotate CW to be tightened, thus tightening the chucking by the chuck member 9, so that the tool 11 is securely fixed.

The reverse driver 43 is analogous in configuration to the forward driver 41, subject to the direction of rotation to be reversed, as apparent on a one-directional rotary mechanism holder 147 that corresponds to the holder 47.

In this case, therefore, as the one-directional rotary mechanism holder 147 is reciprocally rotated by operating an actuator 53 when a ratchet wheel 49 is engaged with the nut 13, simply reverse rotation of the one-directional rotary mechanism-holder 147 is intermittently transmitted to the ratchet wheel 49, causing the nut 13 to rotate CCW to be loosened, thus loosening the chucking by the chuck member 9, so that the tool 11 can be removed.

For replacement of a tool 11 by detachment and attachment relative to the spindle 5, firstly, the spindle 5 is moved and positioned relative to the reverse driver 43, and the nut 13 is engaged with the ratchet wheel 49 in the reverse driver 43. Then, the nut 13 is reverse-rotated to loosen the chucking of tool 11 by the chuck member 9.

After the chucking of tool 11 by the chuck member 9 is loosened, the tool 11 is held by the tool holding jig 35 of the tool changer 29 and removed from the spindle 5. Then, the tool changer 29 is moved and positioned relative to a desirable one of empty tool pots, and the removed tool 11 is accommodated in the empty tool pot. The reverse driver 43 is now disengaged from the nut 13.

Thereafter, the tool changer 29 is moved and positioned relative to a tool pot in which a tool 11 to be applied is set. The tool 11 to be applied is then held by the tool holding jig 35. Then, the spindle 5 is moved and positioned relative to the forward driver 41, and the nut 13 is engaged with the ratchet wheel 49 in the forward driver 43. As a mounting part of the tool 11 held by the tool holding jig 35 of the tool changer 29 is inserted into the chuck member 9, the ratchet wheel 49 in the forward driver 43 is CW rotated, thus causing the nut 13 to rotate CW, so that the tool 11 is securely chucked by the chuck member 9, whereby the tool 11 is mounted to the spindle 5.

Accordingly, in arrangement in which a nut 13 provided at a distal end of a spindle 5 is rotatable in a forward direction to tighten a chucking of a tool 11 by a chuck member 9 and in a reverse direction to loosen the chucking, there can be achieved an automatic replacement of the tool 11 by detachment and attachment relative to the spindle 5.

Figure 3:
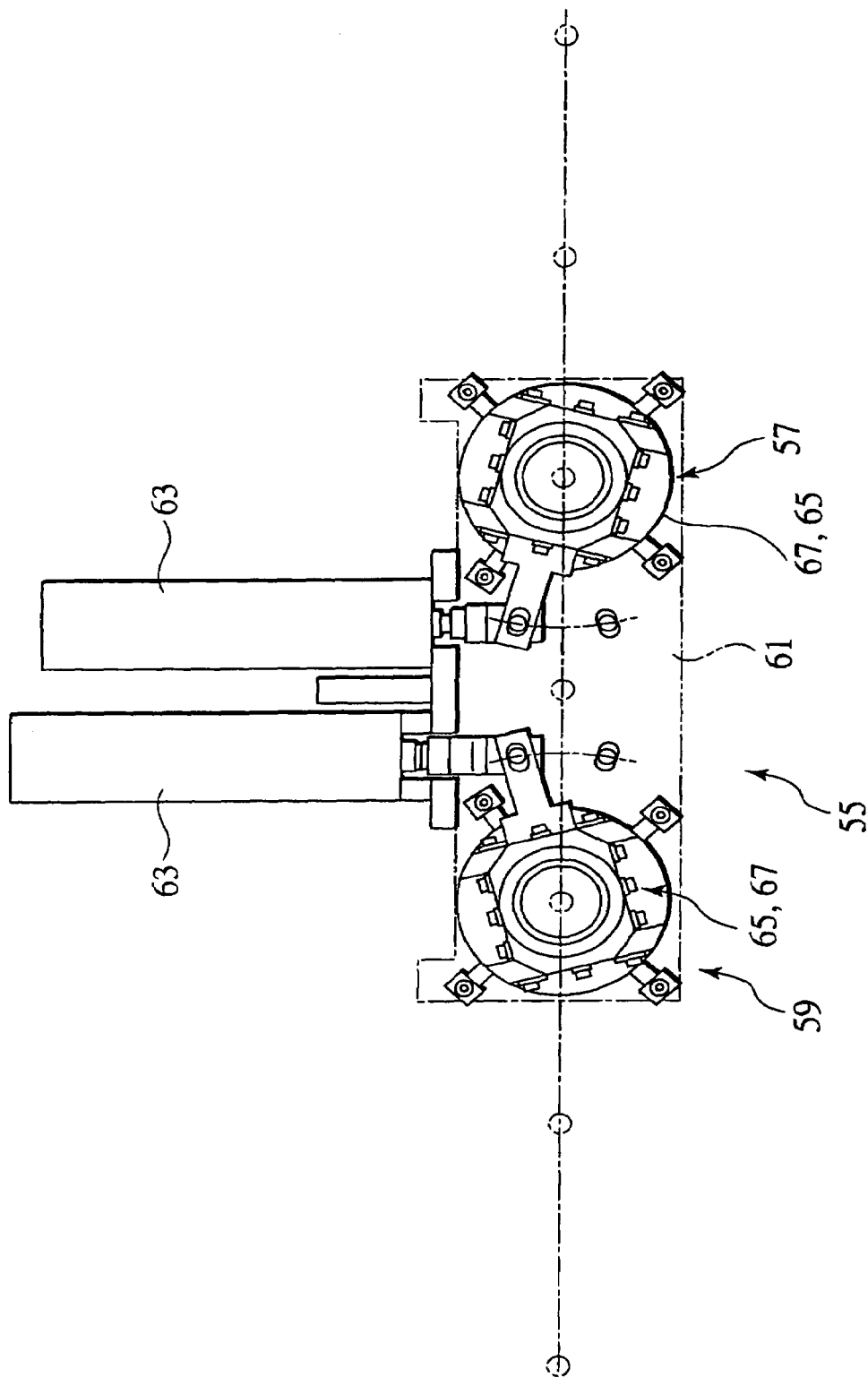
FIG. 3 is a plan of a nut driver according to a second embodiment of the invention.

FIG. 3 shows a nut driver 55 according to a second embodiment of the invention. Relative to the first embodiment in which the nut driver 27 is accommodated to such arrangement that the spindle 5 of machine tool can be held in a fixed position by the brake 19, the second embodiment is distinctive in that the nut driver 55 has a spindle rotation preventing mechanism adaptive to keep a spindle 5 from being rotated when a nut 13 provided for the spindle 5 is rotated in a forward or reverse direction.

The nut driver 55 is configured as a neighboring combination of a forward driver 57 adapted as a nut tightening driver for driving the nut 13 to rotate in a nut tightening direction (CW) like the forward driver 41, and a reverse driver 59 adapted as a nut loosening driver for driving the nut 13 to rotate in a nut loosening direction (CCW) like the reverse driver 43. The nut driver 55 has a station holder 39 analogous to the station holder 39, as a base for mounting thereon the forward driver 41 and the reverse driver 43.

Figure 4:
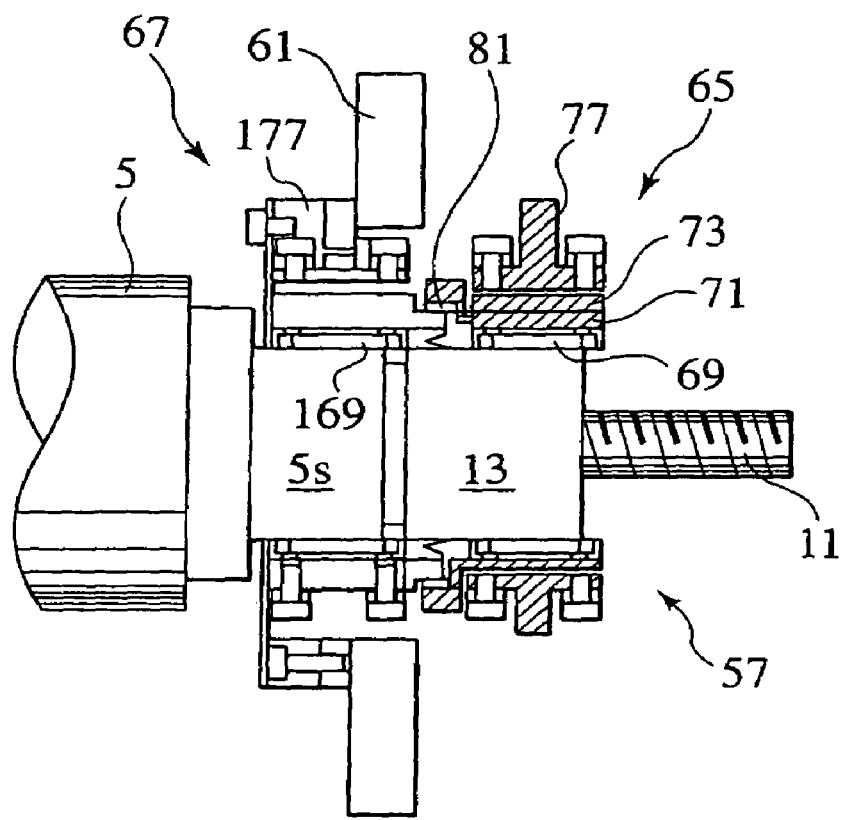
FIG. 4 is a sectional side view of the nut driver of FIG. 3.

As shown in FIG. 4, the forward driver 57 is configured as an axially lapping combination of a rotating driver 65 serving as a forward rotator using a reciprocally acting actuator 63 (FIG. 3) for rotating the nut 13 in the forward direction, like the fluid pressure cylinder mounted on the station holder 61, and a spindle rotation preventer 67 for keeping the spindle 5 from being forward-rotated when the nut 13 rotates.

Figure 5:
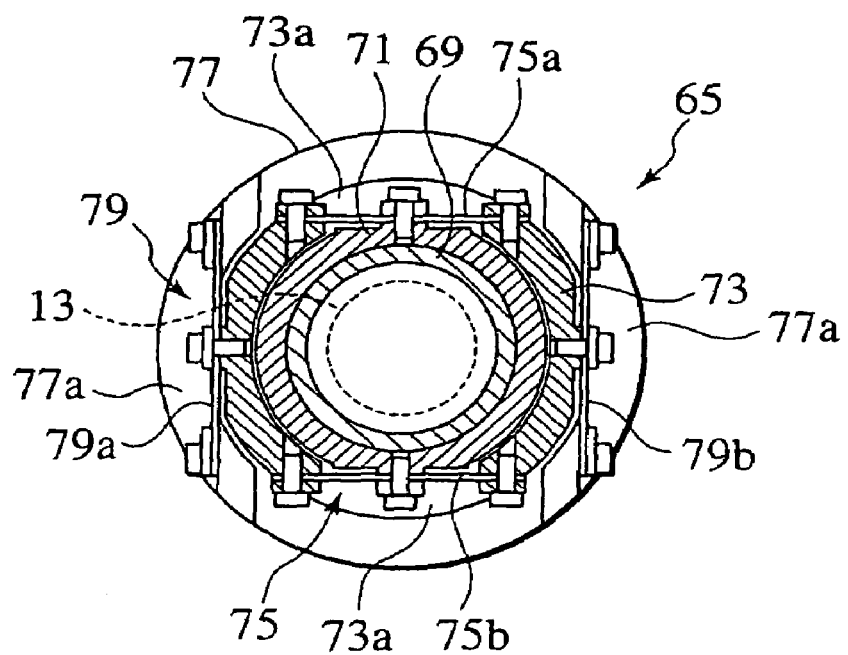
FIG. 5 is a sectional plan of a forward driver of the nut driver of FIG. 3.

More specifically, as shown in FIG. 5, the rotating driver 65 is configured with a one-directional rotary mechanism 69 to be engaged with the nut 13, for driving the nut 13 to rotate simply in the tightening direction (CW). In this embodiment, the one-directional rotary mechanism 69 is configured with a one-way clutch adapted for transmission simply of rotation in one direction, and integrally fitted to be borne in a cylindrical one-directional rotary mechanism holder 71.

The one-directional rotary mechanism holder 71 is loose fitted in a cylindrical intermediate mount 73, with a slight clearance left therebetween, and supported by a first resilient support mechanism 75 so as to have an axis thereof substantially coincident with an axis of the intermediate mount 73. The first resilient support mechanism 75 is configured with a pair of plate springs 75a and 75b fastened, e.g. by bolts, at longitudinally middle parts thereof to diametrically opposite positions of the one-directional rotary mechanism holder 71, and at both ends thereof to opposing insides of cutouts 73a formed in plane-symmetrical arcuate-sections of the intermediate mount 73.

In other words, the one-directional rotary mechanism holder 71 is displaceably supported in the intermediate mount 73, via the first resilient support mechanism 75 made of the paired plate springs 75a and 75b.

The intermediate mount 73 is rotatably supported on the station holder 61, and fitted, with a slight clearance left, in a cylindrical rotary mount 77, which is reciprocally rotated by the reciprocally acting actuator 63, so as to be supported by a second resilient support mechanism 79, having an axis thereof coincident with an axis of the rotary mount 77.

The second resilient support mechanism 79 is configured with a pair of plate springs 79a and 79b arranged to be perpendicular to the plate springs 75a and 75b and fastened, e.g. by bolts, at longitudinally middle parts thereof to diametrically opposite positions of the intermediate mount 73, and at both ends thereof to both ends of cutouts 77a formed in plane-symmetrical chord-regions of the rotary mount 77. In other words, the intermediate mount 73 is displaceably supported in the rotary mount 77, via the second resilient support mechanism 79 made of the paired plate springs 79a and 79b.

Accordingly, the one-directional rotary mechanism holder 71 supporting the one-directional rotary mechanism 69 is supported on the rotary mount 77, via a dual resilient support mechanism made of the first and second resilient support mechanisms 75 and 79.

As the rotary mount 77 is rotated in the forward direction (CW) by operating the reciprocally acting actuator 63 under the condition that the one-directional rotary mechanism 69 is internally engaged with the nut 13 applied to the spindle 5, the forward rotation is transmitted via the plate springs 79a and 79b of the second resilient support mechanism 79 to the intermediate mount 73, of which forward rotation is transmitted via the plate springs 75a and 75b of the first resilient support mechanism 75 to the one-directional rotary mechanism holder 71, and to the one-directional rotary mechanism 69.

Forward rotation of the one-directional rotary mechanism 69 is then transmitted to the nut 13, which is thus forward-rotated. Reciprocal action of the actuator 63 provides an intermittent rotation in the reverse direction (CCW), which causes the one-directional rotary mechanism 69 to idle in the reverse direction relative to the nut 13, which reverse rotation is thus allowed, but not transmitted to the nut 13. Accordingly, upon operation of the reciprocally acting actuator 63, the nut 13 is intermittently forward-rotated, thereby tightening the chucking by the chuck member 9.

Figure 6:
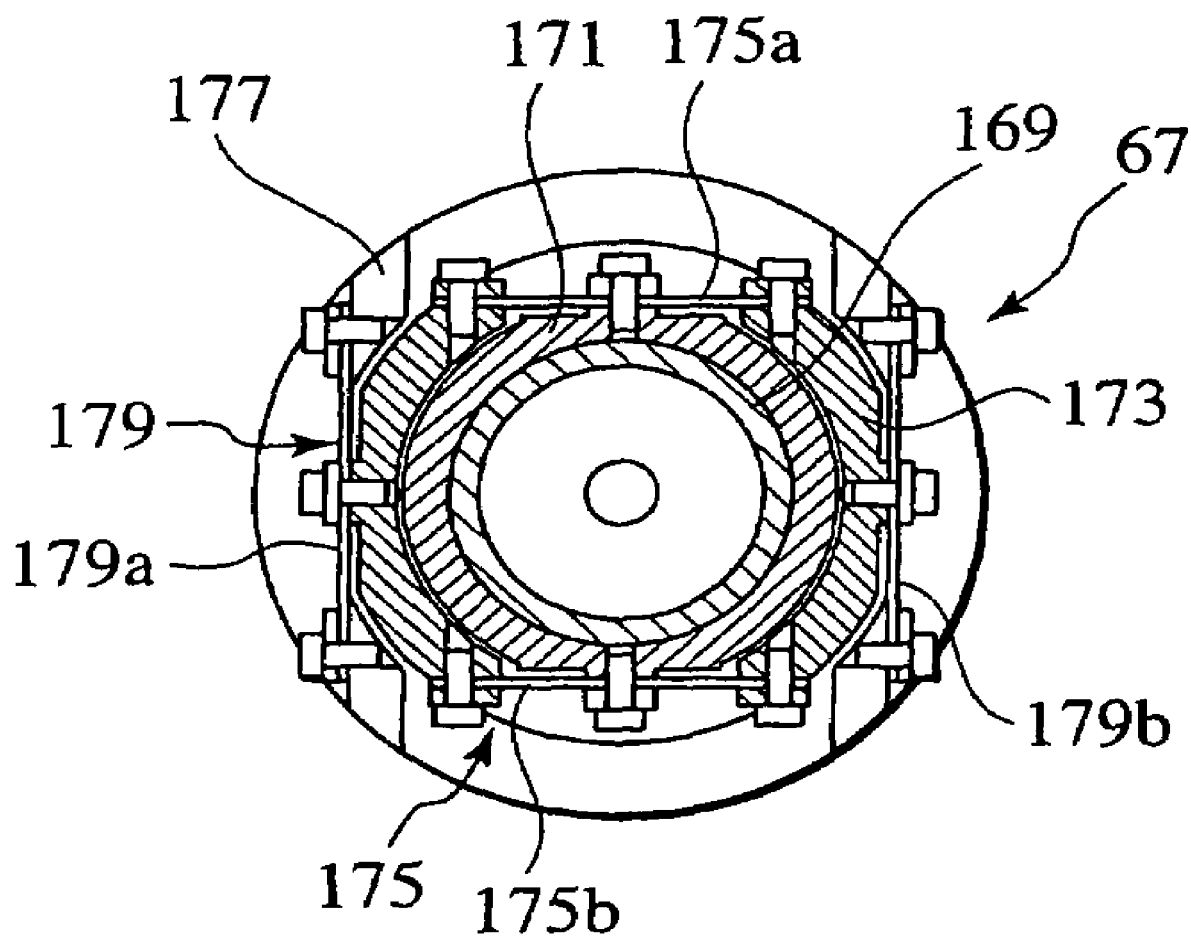
FIG. 6 is a sectional plan of a reverse driver of the nut driver of FIG. 3.

As shown in FIG. 6, the spindle rotation preventer 67 is analogous in configuration to the rotating driver 65, subject to such mere differences that the direction of rotation is reversed at a one-directional rotary mechanism 169 (corresponding to 69) configured with a one-way clutch, and that a rotary mount 177 (corresponding to 77) is fixed to the station holder 61. For example, the spindle rotation preventer 67 includes a one-directional rotary mechanism 171 (corresponding to 71), an intermediate mount 173 (corresponding to 73), a first resilient support mechanism 175 (corresponding to 75) configured with plate springs 175a and 175b (corresponding to 75a and 75b), and a second resilient support mechanism 179 (corresponding to 79) configured with plate springs 179a and 179b (corresponding to 79a and 79b). It is noted that, as shown in FIG. 4, a slip bearing 81 is interposed between the rotating driver 65 and the spindle rotation preventer 67 (as well as between 165 and 167).

In the arrangement described, the spindle 5 is moved and positioned relative to the forward driver 57, so that the nut 13 of the spindle 5 is engaged with the forward driver 57, whereby the reverse-rotating rotary mechanism 169 of the spindle rotation preventer 67 engages a small-diameter part 5s of the spindle 5 that has the same diameter as the nut 13, and the one-directional rotary mechanism 69 of the rotating driver 65 engages the nut 13 that is screwed to a distal end of the small-diameter part 5s of the spindle 5.

Therefore, when the one-directional rotary mechanism 69 is forward-rotated by operating the actuator 63, the nut 13 also is forward-rotated. In this condition, as the spindle 5 is not fixed, it has a tendency to rotate together with the nut 13.

However, the spindle rotation preventer 67 has the reverse-rotating rotary mechanism 169, which serves to prevent a one-directional rotation (forward rotation) of the spindle 5, so that the spindle 5 is fixed relative to the forward-rotating nut 13. In other words, relative to a one-directional rotation of the nut 13, the spindle 5 is rotated in the opposite direction.

Accordingly, by operation of the rotating driver 65, the nut 13 can be rotated in the forward direction to tighten the chucking by the chuck member 9, and the tool 11 can be securely chucked by the chuck member 9.

The reverse driver 59 is configured with a reverse-rotating driver for driving the nut 13 to rotate in the reverse direction, and a spindle rotation preventer adapted for engagement with the small-diameter part 5s of the spindle 5 to prevent the spindle 5 against reverse rotation. More specifically, in arrangement of rotating driver 65 and rotation preventer 67, the reverse driver 59 has a reversed relationship to the forward driver 57. In other words, in the reverse driver 59, the rotation preventer 67 is constituted as a reverse-rotating driver to be reverse-rotated by an actuator 63, and the rotating driver 65 is constituted as a spindle rotation preventer fixed to he station holder 61.

That is, in the reverse driver 59, the one-directional rotary mechanism 69 shown in FIG. 4 is constituted as a one-way clutch adapted for transmission of a reverse rotation (CCW) to the nut 13, and the reverse-rotating driver 169 is constituted as a one-way clutch adapted for transmission of a forward rotation (CW), while the rest of configuration is analogous to the forward driver 57.

When the spindle 5 is engaged with the reverse driver 59, it thus so follows that the small-diameter part 5s of the spindle 5 is engaged with a reverse-rotating driver 65 in a fixed condition, and the nut 13 is engaged with a reverse-rotating rotation preventer 67. Therefore, the nut 13 is reverse-rotated to release the tool 11 from the chucking by the chuck member 9, thereby allowing attachment and detachment of the tool.

FIG. 7 schematically shows the relationship between the forward-rotating driver 65 and the rotation preventer 67 in the forward driver 57. In the forward driver 57, the forward-rotating driver 65 is located at a distal end, to be forward-rotated by the actuator 63, and the rotation preventer 67 is set in a fixed condition.

To the contrary, in the reverse driver 59, the rotation preventer 67 is located at a distal end, to be reverse-rotated by the actuator 63, and the forward-rotating driver 65 is set in a fixed condition. In the reverse driver 59, therefore, the forward-rotating driver 65 constitutes a rotation preventing mechanism, and the rotation preventer 67 constitutes a rotating driver.

In FIG. 7, as the station holder 61 is relatively moved so that the reverse driver 59 is engaged with the spindle 5 and positioned relative to a tool changer 29, the reverse-rotating driver 67 is operated to reverse-rotate the nut 13 on the spindle 5, thereby releasing the tool 11 from the chucking by the chuck member 9. Then, by the tool changer 29, the tool 11 is removed from the spindle 5, and the removed tool 11 is carried and positioned to an empty tool pot PO, and accommodated therein.

The tool changer 29 is moved and positioned to a tool pot P1 where a tool 11 for replacement is set in advance, and operated to hold the tool 11. Then, the forward driver 57 is moved and positioned relative to the spindle 5, so that the spindle 5 is engaged therewith. Then, the tool 11 for replacement is inserted into the chuck member 9 by the tool changer 29, and the forward-rotating driver 65 is rotated for driving the nut 13 to rotate in a tightening direction, so that the tool 11 is chucked tight by the chuck member 9.

Accordingly, it is possible to perform automatic replacement of tool 11 by detachment and attachment relative to the spindle 5.

It is noted that when the nut 13 on the spindle 5 is rotated in forward or reverse direction, the axis of the spindle 5 should coincide with the axis of the rotating driver 65 or 67 in the forward driver 57 or reverse driver 59, respectively. In this respect, if the forward driver 57 or reverse driver 59 is positioned to the spindle 5 with a minor or fine error, such that due to the error the rotating driver 65 or 67 has a tendency to give a deviation in position of the spindle 5 when rotating the nut 13, then the respective plate springs in the first and second resilient support mechanisms 75 and 79 or 175 and 179 supporting the one-directional rotary mechanisms 71 or 171 resiliently deform to absorb such errors.

Therefore, even if a minor or fine error is found in the positioning of forward driver 57 or reverse driver 59 relative to the spindle 5, the engagement with or disengagement from the nut 13 can be accomplished with ease, and the nut 13 can be rotated in the forward or reverse direction without causing deviations in position of the spindle 5.

As will be seen from the foregoing description, according to the invention, in a machine tool in which a spindle has at a distal end thereof a nut screwed thereto and rotatable for tightening and loosening a chuck provided thereto, it is possible to automatically drive the nut to rotate in a forward direction and in a reverse direction, so that a tool replacement to the spindle can be automatically performed by using an automatic tool changer.

The contents of the Japanese Patent Application No. 2002-194979 are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A nut driver for a machine tool including a spindle having a chuck provided on a distal end thereof for chucking a tool and a nut screwed to the distal end and rotatable for tightening and loosening the chucking, the nut driver comprising:
   a nut tightening driver engageable with the nut for driving the nut in a tightening direction of the nut;
   a nut loosening driver engageable with the nut for driving the nut in a loosening direction of the nut; and
   a station holder configured to be positioned relative to the spindle, and to mount thereon a neighboring combination of the nut tightening driver and the nut loosening driver.

2. A nut driver according to claim 1, further comprising:
   a spindle fixer for fixing the spindle when the nut is driven by one of the nut tightening driver and the nut loosening driver.

3. A nut driver according to claim 1, wherein:
   the nut tightening driver comprises an axially lapping combination of a forward-rotating driver engageable with the nut for driving the nut to rotate in a forward direction, and a first spindle rotation preventer engageable with the spindle for preventing the spindle from rotating in the forward direction; and
   the nut loosening driver comprises an axially lapping combination of a reverse-rotating driver engageable with the nut for driving the nut to rotate in a reverse direction of the forward direction, and a second spindle rotation preventer engageable with the spindle for preventing the spindle from rotating in the reverse direction.

4. A nut driver according to claim 3, wherein the combination of the nut tightening driver and the nut loosening driver comprises:
   a one-directional rotary mechanism holder provided with a one-directional rotary mechanism engageable with the nut for driving the nut to rotate simply in one direction;
   a first intermediate mount having a first resilient support mechanism for supporting the one-directional rotary mechanism holder substantially in a co-centered condition;
   a rotary mount having a second resilient support mechanism for supporting the first intermediate mount substantially in a co-centered condition;
   an actuator for actuating the rotary mount to rotate;
   a rotation preventing mechanism holder provided with a rotation preventing mechanism engageable with the spindle to prevent the spindle from rotating relative to rotation of the nut in the one direction;
   a second intermediate mount having a third resilient support mechanism for supporting the rotation preventing mechanism holder substantially in a co-centered condition; and
   a spindle fixer provided with an non-rotatable stationary mount having a fourth resilient support mechanism for supporting the second intermediate mount substantially in a co-centered condition.

5. A nut driver according to claim 4, wherein:
   the first resilient support mechanism comprises a pair of first plate springs, with the one-directional rotary mechanism holder in between;
   the second resilient support mechanism comprises a pair of second plate springs substantially perpendicular to the pair of first plate springs, with the first intermediate mount in between;
   the third resilient support mechanism comprises a pair of third plate springs, with the rotation preventing mechanism holder in between; and
   the fourth resilient support mechanism comprises a pair of fourth plate springs substantially perpendicular to the pair of third plate springs, with the second intermediate mount in between.

* * * * *